(12) United States Patent
Schröder et al.

(10) Patent No.: US 11,018,398 B2
(45) Date of Patent: May 25, 2021

(54) FASTENING ASSEMBLY ON A BATTERY HOUSING AND BATTERY HOUSING HAVING SUCH A FASTENING ASSEMBLY

(71) Applicant: Volkswagen Aktiengesellschaft, Wolfsburg (DE)

(72) Inventors: Lutz Schröder, Ilsede (DE); Daniel Weidemann, Braunschweig (DE); Sandra Hettwer, Edemissen (DE); Oliver Rauls, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 117 days.

(21) Appl. No.: 16/470,360

(22) PCT Filed: Sep. 12, 2017

(86) PCT No.: PCT/EP2017/072918
§ 371 (c)(1),
(2) Date: Jun. 17, 2019

(87) PCT Pub. No.: WO2018/114067
PCT Pub. Date: Jun. 28, 2018

(65) Prior Publication Data
US 2019/0312245 A1    Oct. 10, 2019

(30) Foreign Application Priority Data

Dec. 20, 2016 (DE) ..................... 10 2016 225 662.9

(51) Int. Cl.
*H01M 50/262* (2021.01)
*H01M 50/204* (2021.01)
(Continued)

(52) U.S. Cl.
CPC ....... *H01M 50/262* (2021.01); *H01M 50/204* (2021.01); *H01M 50/249* (2021.01); *H01M 50/271* (2021.01); *H01M 2220/20* (2013.01)

(58) Field of Classification Search
CPC ............ H01M 2/1016; H01M 2/1072; H01M 2/1077; H01M 2/0434; H01M 50/204;
(Continued)

(56) References Cited

U.S. PATENT DOCUMENTS

| 2009/0148766 A1 | 6/2009 | Xi et al. ...................... 429/164 |
| 2010/0307848 A1 | 12/2010 | Hashimoto et al. ......... 180/68.5 |

(Continued)

FOREIGN PATENT DOCUMENTS

| DE | 1173553 B | * 7/1964 | .......... H01M 2/0434 |
| DE | 102010022876 A1 | 1/2011 | ............... B60K 1/04 |
| DE | 102009037138 A1 | 2/2011 | ............... B60K 1/04 |
| DE | 102012004135 A1 | 8/2013 | ............... H01M 2/10 |
| DE | 102014017177 A1 | 6/2015 | ............... H01M 2/10 |
| DE | 102016225662 A1 | 6/2018 | ............... H01M 2/02 |
| EP | 2479818 A1 | 7/2012 | ............... B60K 1/04 |

(Continued)

OTHER PUBLICATIONS

International Search Report and Written Opinion, Application No. PCT/EP2017/072918, 15 pages, dated Oct. 20, 2017.

*Primary Examiner* — Gregg Cantelmo
(74) *Attorney, Agent, or Firm* — Slayden Grubert Beard PLLC

(57) ABSTRACT

The invention relates, inter alia, to an assembly for fastening an upper shell or a lid to a lower shell of a battery housing, said assembly having at least one fastening element, by means of which the upper shell or the lid is or can be frictionally connected to the lower shell in the region of contact flanges, which correspond with each other and are laid one over the other. The at least one fastening element is formed by a rail element that has a U-profile-shaped cross-section at least in some sections which rail element has a web and an upper and a lower flange and is or can be slid onto the contact flanges from the end edges of the contact flanges, which are laid one over the other, and is or can be (Continued)

at least frictionally connected to the contact flanges as a result of a subsequent movement in the longitudinal direction of the contact flanges.

18 Claims, 3 Drawing Sheets

(51) Int. Cl.
*H01M 50/249* (2021.01)
*H01M 50/271* (2021.01)

(58) Field of Classification Search
CPC . H01M 50/249; H01M 50/262; H01M 50/271
See application file for complete search history.

(56) References Cited

U.S. PATENT DOCUMENTS

| | | | |
|---|---|---|---|
| 2011/0151319 A1* | 6/2011 | Cherng | H01M 2/10 429/177 |
| 2011/0236740 A1* | 9/2011 | Paolazzi | H01M 10/6551 429/120 |
| 2014/0120413 A1 | 5/2014 | Nielsen | 429/179 |
| 2015/0171390 A1* | 6/2015 | Yoshioka | B60L 50/64 429/156 |

FOREIGN PATENT DOCUMENTS

| | | | | |
|---|---|---|---|---|
| WO | 2016/049836 A1 | 4/2016 | | H01M 10/04 |
| WO | 2018/114067 A1 | 6/2018 | | H01M 2/04 |

* cited by examiner

FASTENING ASSEMBLY ON A BATTERY HOUSING AND BATTERY HOUSING HAVING SUCH A FASTENING ASSEMBLY

CROSS-REFERENCE TO RELATED APPLICATIONS

This application claims priority to German Patent Application No. DE 10 2016 225 662.9, filed on Dec. 20, 2016 with the German Patent and Trademark Office. The contents of the aforesaid application are incorporated herein for all purposes.

TECHNICAL FIELD

The invention relates to an assembly for fastening an upper shell or a lid to a lower shell of a battery housing. The invention also relates to a battery housing, in particular to a high voltage battery of a vehicle, comprising such a fastening assembly.

BACKGROUND

DE 10 2012 004 135 A1 describes a fastening assembly of the generic type, an upper shell and a lower shell of a battery case of a traction battery in each case forming a contact flange in a peripheral edge region in a manner corresponding to one another. The contact flanges lie one on top of the other with the interposition of a seal and are interconnected by means of multiple fastening clips made, for example, of spring steel.

SUMMARY

An object of the invention is to provide an alternative fastening assembly to that provided in the prior art, which involves reduced effort and ensures secure fastening of an upper shell or a lid to a lower shell of a battery housing. Another object is to provide a battery housing, in particular of a high voltage battery of a vehicle, comprising such a fastening assembly.

The objects are solved by the subject matter of the independent claims. The dependent claims describe some developments or embodiments of the invention.

DETAILED DESCRIPTION

Figure 1:
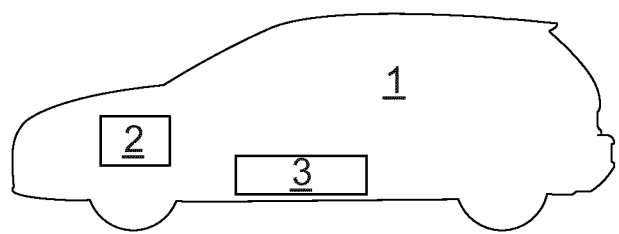
FIG. 1 shows a vehicle equipped with a traction battery in a highly schematic manner.

In one aspect, an assembly for fastening an upper shell or a lid to a lower shell of a battery housing, comprising at least one fastening element, by means of which the upper shell or lid is or can be frictionally connected to the lower shell in the region of contact flanges which correspond with each other and are arranged one on top of the other, is provided. The at least one fastening element is formed of a rail element that has a U-profile-shaped cross-section at least in some sections and that has a web and an upper and lower flange and that is or can be slid onto the contact flanges from the end edge of said contact flanges, which are laid one on top of the other, and that is or can be at least frictionally connected to the contact flanges as a result of a subsequent movement in the longitudinal direction of the contact flanges.

By this design, a quick, secure and tight connection between the upper shell or lid and the lower shell of a battery housing is made possible. With regard to a battery housing, for example of a traction battery of a vehicle, which battery housing generally forms a cuboid or cube-shaped hollow body for receiving battery modules comprising battery cells, four edge portions of, e.g., peripheral contact flanges of the upper shell or lid and the lower shell of the battery housing are produced as a result, offering a maximum of four such rail elements according to a particularly simple and cost-effective embodiment of the present aspect, which rail elements can extend in each case over approximately the entire extent of an edge portion. A plurality of fastening elements, as is favored according to the prior art, can be dispensed with in the present aspect.

A particularly functionally reliable embodiment of the present aspect provides that the rail element has at least one recess in the region of the upper and/or lower flange that is open towards said end edge and that is surrounded at the sides by the upper or lower flange, a protuberance in the immediately adjacent contact flange being assigned to the recess such that, as a result of the rail element being slid onto the contact flanges, the rail element adopts a pre-assembly position when the protuberance is/will be received by the recess and such that, as a result of the subsequent movement of the rail element in the longitudinal direction of the contact flanges, the protuberance is/will be positioned below the upper or lower flange in a final assembly position of the rail element. Said protuberance may for example be formed of an embossment, bead or bulge. In some embodiments, the protuberance is designed to be oversized in terms of the height, so that the rail element is connected to the contact flanges in a prestressed manner in said final assembly position, resulting in a particularly secure and tight join. In order to facilitate the sliding movement of the rail element in particular in the longitudinal direction of the contact flanges, the protuberance of the relevant contact flange forms a ramp at least in said sliding direction along the contact flanges. In some embodiments, it is further provided for the rail element to be secured in said final assembly position against a movement of the rail element transverse to the longitudinal extension of the contact flanges. Said action of securing the rail element against a movement transverse to the longitudinal extension of the contact flanges is achieved by means of a tab which is arranged on or close to the free end of the upper or lower flange when viewed in the cross-section thereof and is oriented towards the immediately adjacent contact flange having the protuberance. Said tab may be formed of an embossment, bead or similar protuberance, such as a bulge, on or close to the free end of the upper or lower flange or a bent portion of the free end of the upper or lower flange. As a result, the rail element is effectively secured against unintentional, in particular independent, release due to vibrations that occur for example when a vehicle is driving. In order to further increase the securing action against unintended, in particular independent, release of the rail element, the rail element may in some embodiments also be secured against a movement of the rail element in the longitudinal direction of the contact flanges in said final assembly position.

A securing action of this kind may further be achieved in some embodiments by means of at least one releasable, mechanical fastening means, which may for example be formed of a screw, pin, cotter pin, or the like, and connects the rail element to the upper shell or lid and/or lower shell.

A further aspect relates to a battery housing having a fastening assembly of the above-described type, it being possible for the battery housing to be a battery housing of a high voltage battery of a vehicle, in particular a motor vehicle, as already indicated above.

In the following, the invention will be explained in greater detail based on the exemplary embodiments shown schematically in the drawings. However, the invention is not limited to these exemplary embodiments, but rather includes all possible embodiments according to the scope of the claims. In the following:

FIG. 1 shows a vehicle 1, in this case a passenger car, comprising an electric motor 2 as the drive motor and a battery assembly 3 forming a traction or respectively high voltage battery. According to this exemplary embodiment, the vehicle is therefore a purely electrically operated vehicle 1. A so-called hybrid vehicle that has a combustion engine as well as one or more electric motors 2 (not shown in the drawings) is in particular also encompassed by the present teaching. Conventionally, one, two or more battery cells are grouped together in at least one module housing to form a battery module (not shown in the drawings). One, two or more such battery modules are arranged in a battery housing 4 shown in FIG. 2. The battery housing 4, which is only partially shown in FIG. 2, has a lower shell 5 onto which the battery module or battery modules is/are placed. In the present case, the lower shell 5 is assigned an upper shell 6 that closes the battery housing 5, is placed onto the lower shell 5 from above and is/will be connected thereto. However, the invention is not limited to said upper shell 6, but rather may also include a lid (not shown in the drawings), which may have a different shape to the upper shell 6, for example a planar shape. The lower and upper shell 5, 6 may for example consist of a plastics material, a plastics material reinforced with fibers and/or inlays, or a metal.

The battery housing 4 forms a cuboid or cube-shaped hollow body for receiving said battery modules. The lower shell 5 and the upper shell 6 of the battery housing 4 each have an outwardly offset, peripheral contact flange 7, 8. In the assembled state, the contact flanges 7, 8 are arranged one on top of the other, if necessary with the interposition of a ring seal (not shown in the drawings) and, by means of separately manufactured fastening elements, are frictionally interconnected so as to be tight. On account of the cuboid or cube-shaped design of the battery housing 4, four edge portions 9, 10 are provided in the region of the contact flanges 7, 8, two of which edge portions 9, 10 are visible in FIG. 2. Merely by way of example, each edge portion 9, 10 is assigned one fastening element.

Embodiment Variant 1 (FIG. 2-5)

According to an embodiment, each fastening element is formed of a rail element 11 that has a U-profile-shaped cross-section and that has a web 12 and also an upper flange 13 and a lower flange 14 (cf. FIG. 10 as well, for example, which relates to a second embodiment variant of the present aspect described below). In the assembled state of the rail element 11, the contact flanges 7, 8, which lie one on top of the other either directly or indirectly via a ring seal, are surrounded by the upper flange 13 and lower flange 14 in the manner of a clip, so to speak, the rail element 11 being supported on the end edge 15 of the contact flanges 7, 8 by means of the web 12. The rail element 11 is therefore slid onto the contact flanges 7, 8 from said end edge 15, i.e., transversely to the longitudinal extension of said contact flanges 7, 8.

According to an embodiment, the rail element 11 is designed as a stamped part and may further consists of sheet metal, especially sheet steel. However, the invention is not limited to a metal material, but rather also encompasses a rail element 11 that is made, for example, of a plastics material, a fiber-reinforced or otherwise reinforced plastics material, or another suitable material that is known per se, in particular a composite material (not shown in the drawings).

The upper flange 13 of the rail element 11 comprises a plurality of recesses 16 that are open towards said end edge 15 and that are surrounded at the sides by the upper flange 13 or material thereof. A quasi comb-like structure of the upper flange 13 with teeth that are arranged at a distance from one another is designed. Each recess 16 is assigned a protuberance 17 oriented towards the upper flange 13 on the contact flange 8 of the upper shell 6, which protuberance is received by the relevant recess 16 when the rail element 11 is slid onto the contact flanges 7, 8. This produces a pre-assembly position 18 of the rail element 11, which can be seen in FIG. 3. The protuberance 17 is formed of an embossment according to one exemplary embodiment. Alternatively, said protuberance may for example be formed of a bead in the rail element 11 or a bulge or respectively knob-shaped protuberance 17 (not shown in the drawings).

Figure 2:
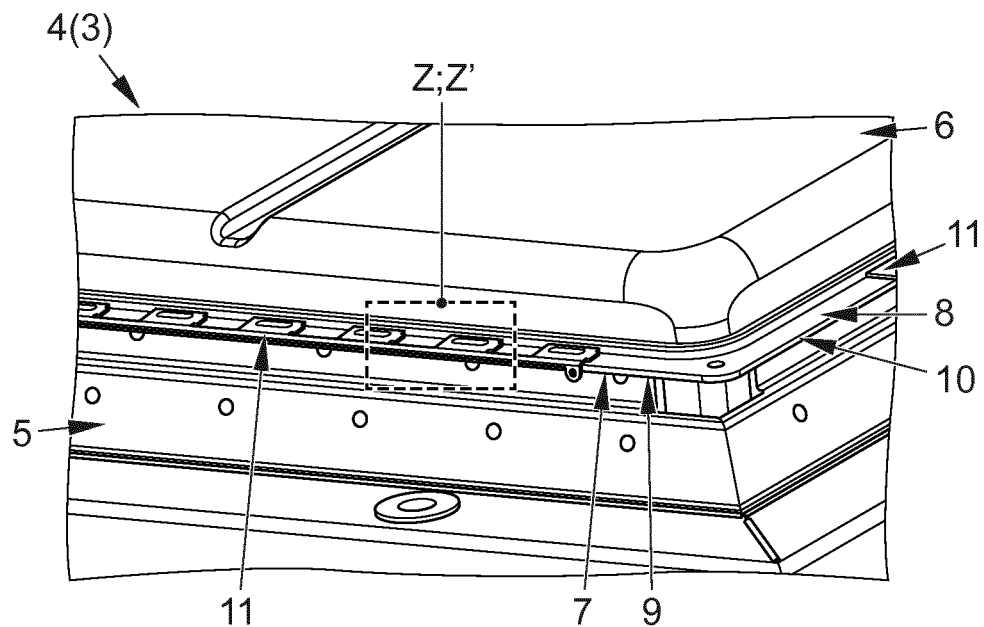
FIG. 2 is a perspective side view of a battery housing of said traction battery according to FIG. 1, which battery housing is formed of a lower shell and an upper shell or respectively a lid and has the fastening assembly according to an embodiment.
Figure 4:
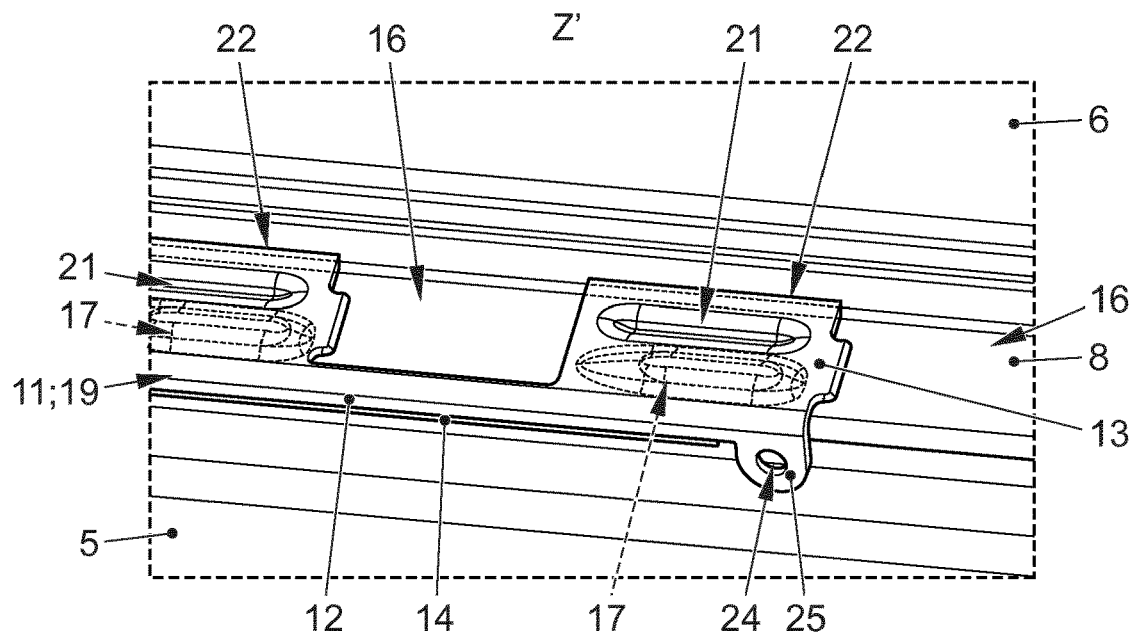
FIG. 4 shows the detail Z' according to FIG. 1, in which said fastening element is shown in a final assembly position.
Figure 5:
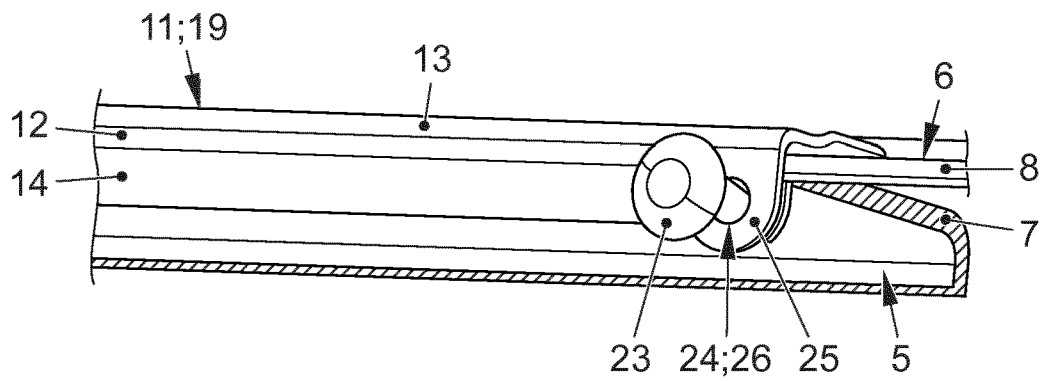
FIG. 5 is a perspective side view of a further developed fastening assembly.
Figure 6:
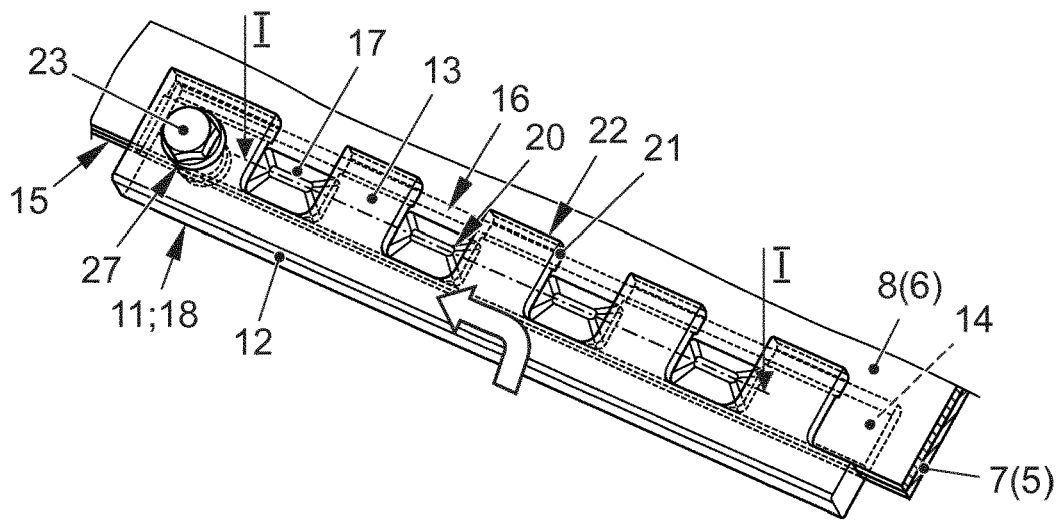
FIG. 6 shows another embodiment variant of the fastening assembly in a perspective top view, in which the fastening element is shown in the pre-assembly position.
Figure 7:
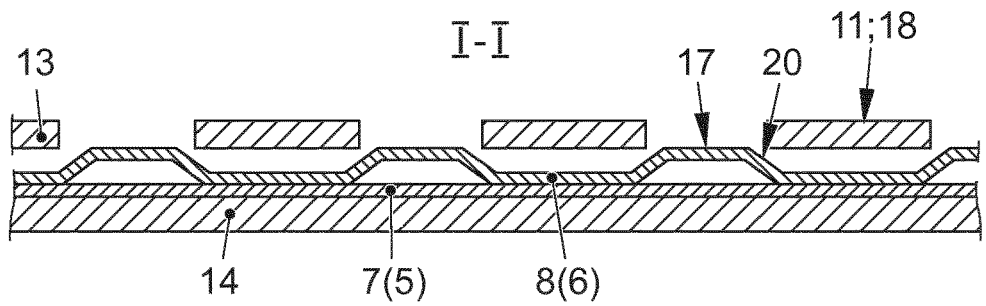
FIG. 7 shows the section "I-I" according to FIG. 6.

Proceeding from said pre-assembly position 18 of the rail element 11, said rail element may be moved into a final assembly position 19 by means of a subsequent movement in the longitudinal direction of the contact flanges 7, 8, as a result of which the protuberance 17 is positioned and clipped underneath a material portion or tooth of the upper flange 1 surrounding the relevant recess 16 (cf. in particular FIGS. 2 and 4). Said clipping action results from the protuberance 17 being oversized in terms of the height thereof such that the rail element 11 is guided onto the highest point of the protuberance 17 in the final assembly position 19 of said rail element and is thus connected to the contact flanges 7, 8 in a prestressed manner.

Figure 3:
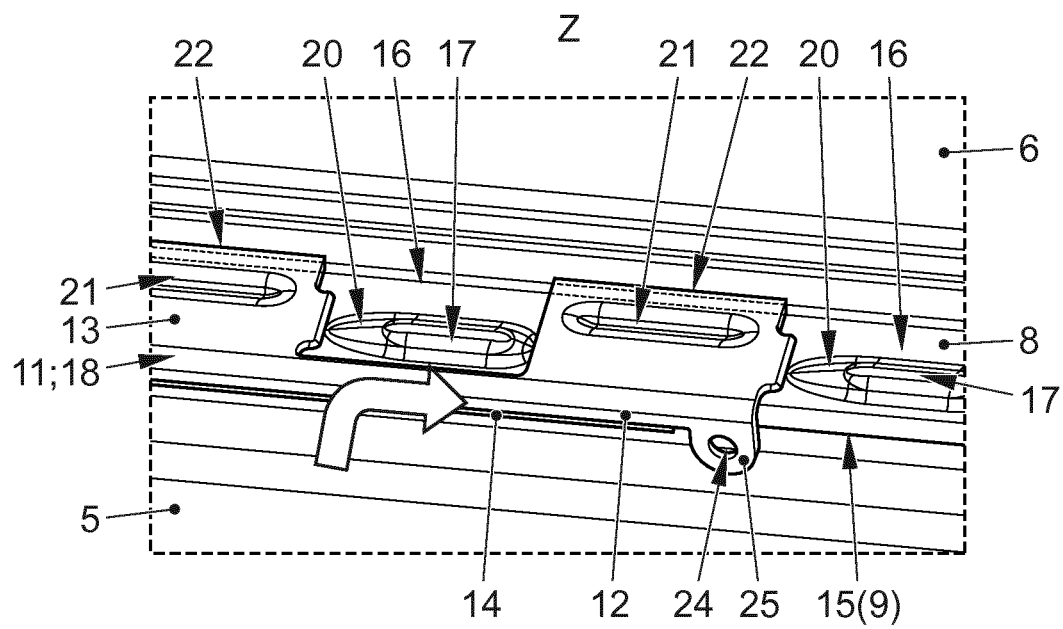
FIG. 3 shows the detail Z according to FIG. 1, in which a fastening element according to an embodiment for fastening the upper shell or respectively the lid to the lower shell is shown in a pre-assembly position.

As can in particular be seen in FIG. 3, the protuberances 17 form a ramp 20 in the sliding direction along the contact flanges 7, 8. This facilitates the sliding movement or respectively transfer movement of the protuberances 17 underneath the material portion or tooth of the upper flange 1 surrounding the recess 16.

As can be seen in FIGS. 3 and 4, the rail element 11 is secured in the final assembly position 19 thereof against a movement transverse to the longitudinal extension of the contact flanges 7, 8. Said securing action is achieved by means of a tab 21 close to the, when viewed in cross-section, free end 22 of the upper flange 13 or respectively tooth of the rail element 11, which tab 21 is oriented towards the contact flange 8 of the upper shell 6 (FIG. 4). In the present case, said tab 21 is, by way of example, merely formed of an embossment in the upper flange 13 or respectively tooth thereof. In contrast, the tab 21 may for example be a bead-shaped formation of the upper flange 13, a bulge or respectively knob-shaped protuberance, or the like (not shown in the drawings). The rail element 11 is therefore prevented from moving transversely away from the contact flanges 7, 8 by means of the tab 21 in the final assembly position 19 of said rail element, since in this case the tab 21 is supported on the protuberance 17.

Furthermore, the rail element 11 is secured in the final assembly position 19 thereof against a movement in the longitudinal direction of the contact flanges 7, 8. This securing action is achieved according to this exemplary embodiment by means of a releasable, mechanical fastening means 23, which in the present case is formed of a securing pin that penetrates a first hole 24, in a flange 25 of the rail element 11 arranged in parallel with the web 12, transversely to the longitudinal extension of the contact flanges 7, 8 and engages in a corresponding second hole 26 in the upper shell 6. Said pin may for example also have latching means (not shown in the drawings), as a result of which unintentional release of said pin is prevented. Alternatively, the fastening means 23 may be formed of a screw, a cotter pin, or the like (not shown in the drawings).

Embodiment Variant 2 (FIG. 6-10)

FIGS. 6 to 10 show another embodiment variant of the fastening assembly, functionally identical parts being provided with the same reference numerals as in the previous FIGS., and therefore reference is also made to the previous description of the preceding embodiment variant in order to explain this embodiment variant.

Figure 8:
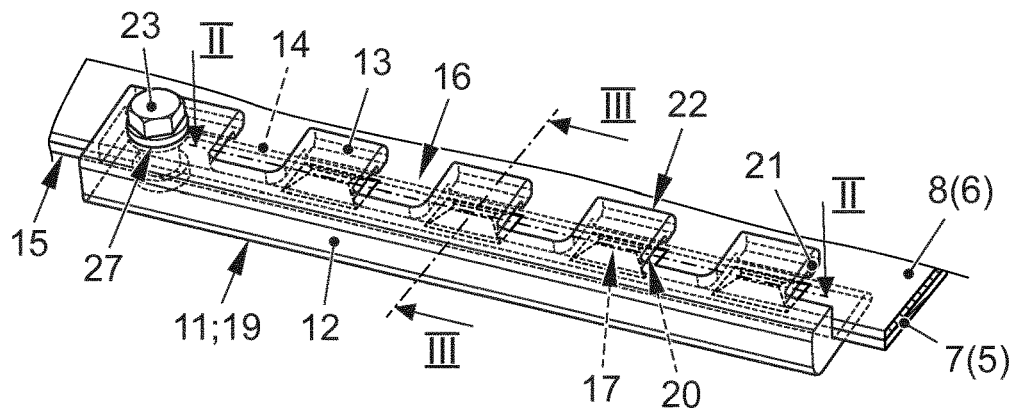
FIG. 8 shows the fastening element according to FIGS. 6 and 7 in the final assembly position.
Figure 9:
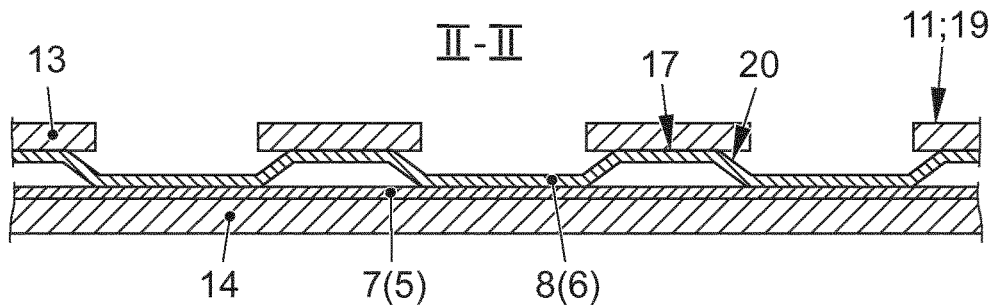
FIG. 9 shows the section "II-II" according to FIG. 8.
Figure 10:
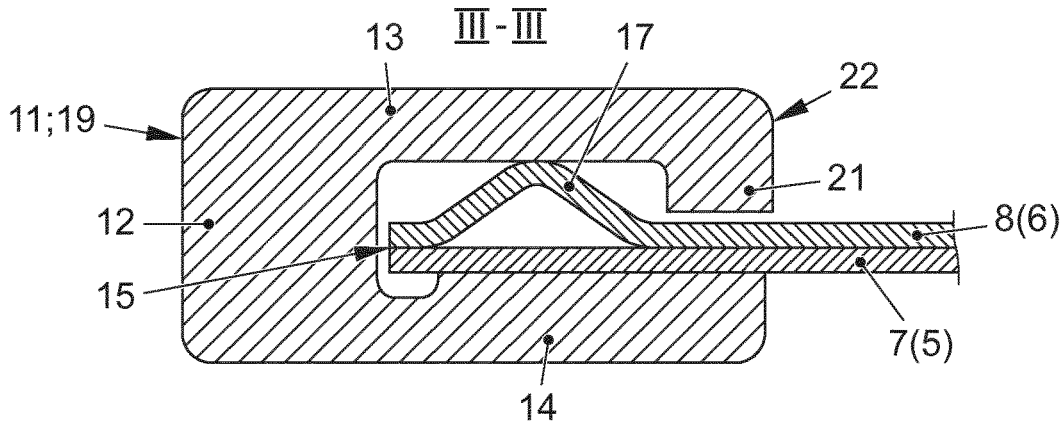
FIG. 10 shows the section "III-III" according to FIG. 8.

This embodiment variant of the fastening assembly differs from the previously described embodiment variant in that, firstly, the tab 21 for securing the rail element 11 in the final assembly position thereof against a movement transverse to the longitudinal extension of the contact flanges 7, 8 is formed of a bent portion of the, when viewed in cross-section, free end 22 of the upper flange 13 or tooth thereof, which bent portion is oriented towards the contact flange 8 of the upper shell 6 (cf. in particular FIGS. 8 and 10). Secondly, the mechanical fastening means 23 for securing the rail element 11 in the final assembly position 19 thereof against a movement in the longitudinal direction of the contact flanges 7, 8 is formed of a fastening screw, which is screwed into a threaded hole 27 in the upper flange 13 of the rail element 11 or a tooth thereof and may be screwed with prestressing against the contact flanges 7, 8 (cf. in particular FIGS. 6 and 8).

The embodiment variants described above are substantially based on a rail element 11, the upper flange 13 of which is designed in a comb-like manner and is or can be frictionally connected to the contact flanges 7, 8 on account of the special design of the contact flange 8 of the upper shell 6 having protuberances 17. However, the invention is not limited to these explicitly described embodiment variants, but rather also includes embodiment variants not shown in the drawings in which the lower flange 14 or both the upper flange 13 and the lower flange 14 are designed in a comb-like manner and the lower flange 14 is assigned protuberances 17 of the described type on the lower shell 5 or both the upper and lower flange 13, 14 are assigned protuberances 17 of the described type on the upper shell 6 and lower shell 5, respectively.

REFERENCE NUMBER LIST

1 Vehicle
2 Electric motor
3 Battery assembly
4 Battery housing
5 Lower shell
6 Upper shell
7 Contact flange (lower shell 5)
8 Contact flange (upper shell 6)
9 Edge portion
10 Edge portion
11 Rail element
12 Web
13 Upper flange
14 Lower flange
15 End edge
16 Recess
17 Protuberance
18 Pre-assembly position
19 Final assembly position
20 Ramp
21 Tab
22 Free end (upper flange 13)
23 Fastening means
24 Hole
25 Flange
26 Hole
27 Threaded hole The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" or "including" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. An assembly for fastening an upper shell or a lid to a lower shell of a battery housing, comprising at least one fastening element, with which the upper shell or lid can be frictionally connected to the lower shell in the region of contact flanges which correspond with each other and are arranged on top of each other, wherein the at least one fastening element is formed of a rail element having a U-profile shaped cross-section at least in some sections, which rail element has a web and an upper and a lower flange and that can be slid onto the contact flanges from an end edge of said contact flanges, and which can be at least frictionally connected to the contact flanges as a result of a subsequent movement in a longitudinal direction of the contact flanges; wherein the rail element has at least one recess in a region of the upper and/or lower flange that is surrounded at the sides by the upper or lower flange; wherein the at least one recess is formed to receive a protuberance of the contact flange, so that, when the rail element is being slid onto the contact flanges, the rail element adopts a pre-assembly position by receiving the protuberance by the at least one recess, and so that, a subsequent movement of the rail element in the longitudinal direction of the contact flanges positions the protuberance below the upper or lower flange in a final assembly position of the rail element.

2. The assembly according to claim 1, wherein the protuberance is designed to be oversized in terms of the height thereof such that the rail element is connected to the contact flanges in a prestressed manner in said final assembly position.

3. The assembly according to claim 1, wherein the protuberance forms a ramp at least in the sliding direction along the contact flanges.

4. The assembly according to claim 1, wherein the rail element is secured in said final assembly position against a movement of the rail element transverse to the longitudinal extension of the contact flanges.

5. The assembly according to claim 4, wherein said securing the rail element against a movement transverse to the longitudinal extension of the contact flanges is provided a tab, which is arranged on or close to a free end of the upper or lower flange when viewed in the cross-section thereof and is oriented towards the immediately adjacent contact flange having the protuberance.

6. The assembly according to claim 5, wherein the tab is formed of an embossment, bead, or protuberance on or near the free end of the upper or lower flange or a bent portion of the free end of the upper or lower flange.

7. The assembly according to claim 1, wherein the rail element is secured in said final assembly position against a movement of the rail element in the longitudinal direction of the contact flanges.

8. The assembly according to claim 7, wherein said securing the rail element against a movement in the longitudinal direction of the contact flanges is provided by at least one releasable, mechanical fastening means.

9. The assembly according to claim 8, wherein the at least one fastening means is formed of a screw, a pin, or a cotter pin, which connects the rail element to the upper shell or lid and/or the lower shell.

10. A battery housing, comprising a fastening assembly according to claim 1.

11. The assembly according to claim 2, wherein the protuberance forms a ramp at least in the sliding direction along the contact flanges.

12. The assembly according to claim 2, wherein the rail element is secured in said final assembly position against a movement of the rail element transverse to the longitudinal extension of the contact flanges.

13. The assembly according to claim 3, wherein the rail element is secured in said final assembly position against a movement of the rail element transverse to the longitudinal extension of the contact flanges.

14. The assembly according to claim 2, wherein the rail element is secured in said final assembly position against a movement of the rail element in the longitudinal direction of the contact flanges.

15. The assembly according to claim 3, wherein the rail element is secured in said final assembly position against a movement of the rail element in the longitudinal direction of the contact flanges.

16. The assembly according to claim 4, wherein the rail element is secured in said final assembly position against a movement of the rail element in the longitudinal direction of the contact flanges.

17. The assembly according to claim 5, wherein the rail element is secured in said final assembly position against a movement of the rail element in the longitudinal direction of the contact flanges.

18. The assembly according to claim 6, wherein the rail element is secured in said final assembly position against a movement of the rail element in the longitudinal direction of the contact flanges.

* * * * *